J. G. VINCENT.
ADDING AND SUBTRACTING MACHINE.
APPLICATION FILED SEPT. 12, 1910.
1,027,511.
Patented May 28, 1912.
5 SHEETS—SHEET 2.
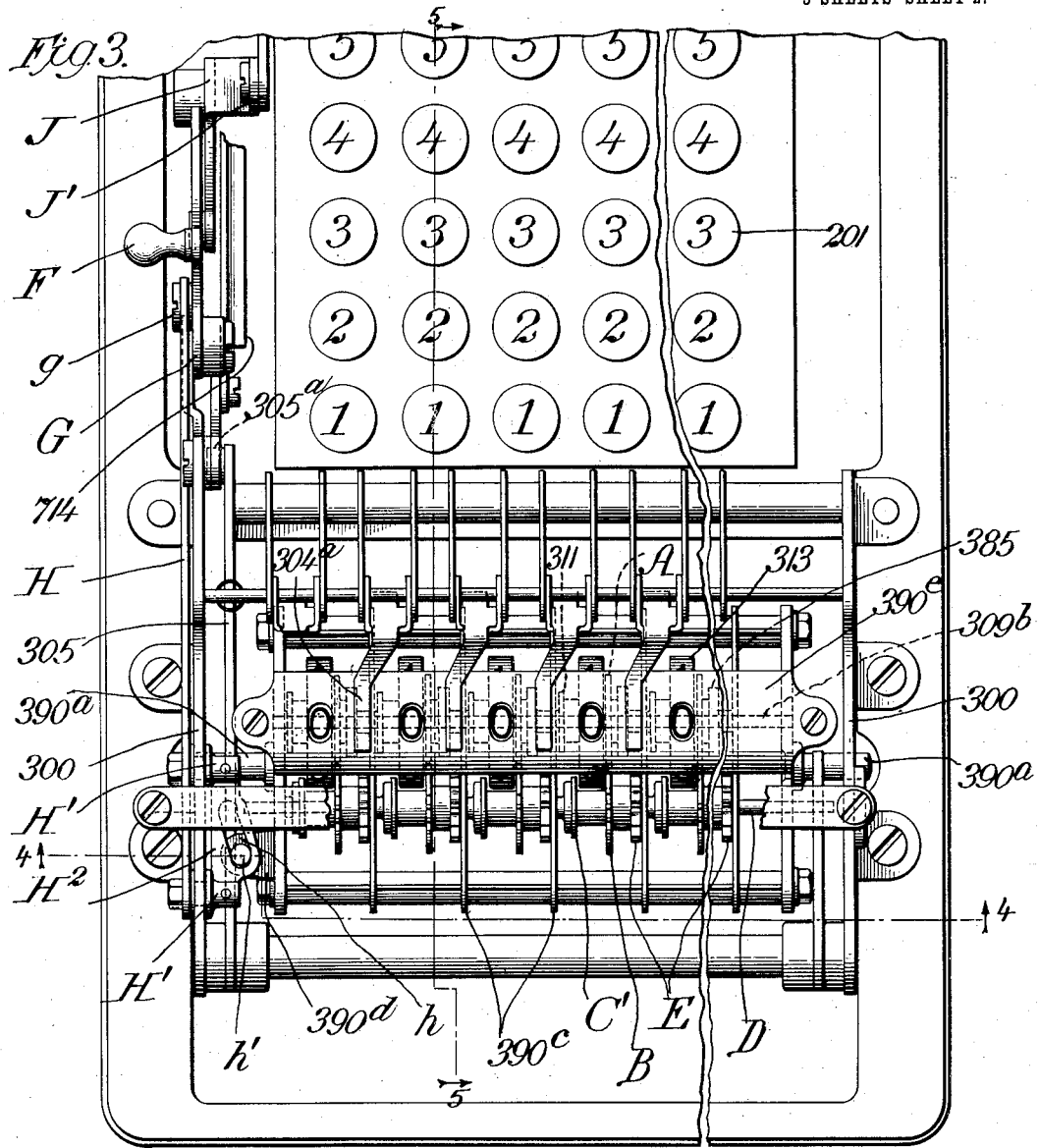
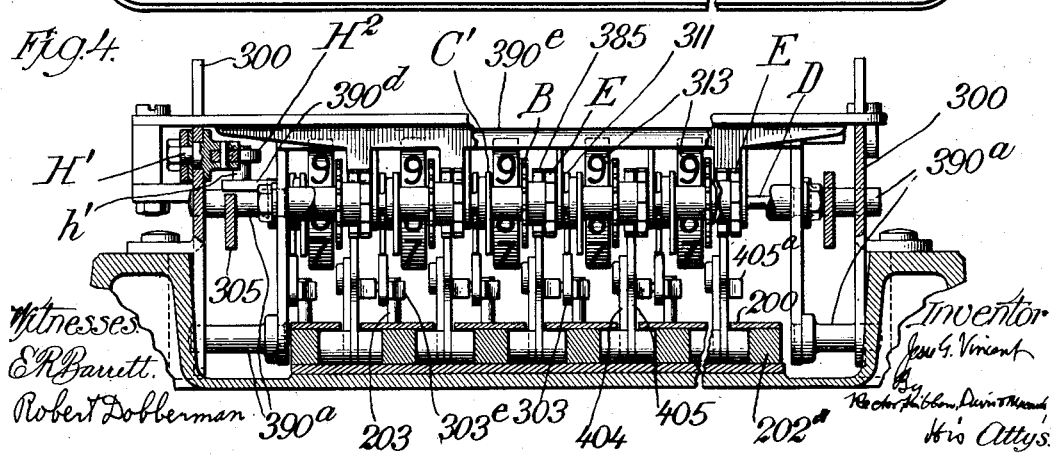

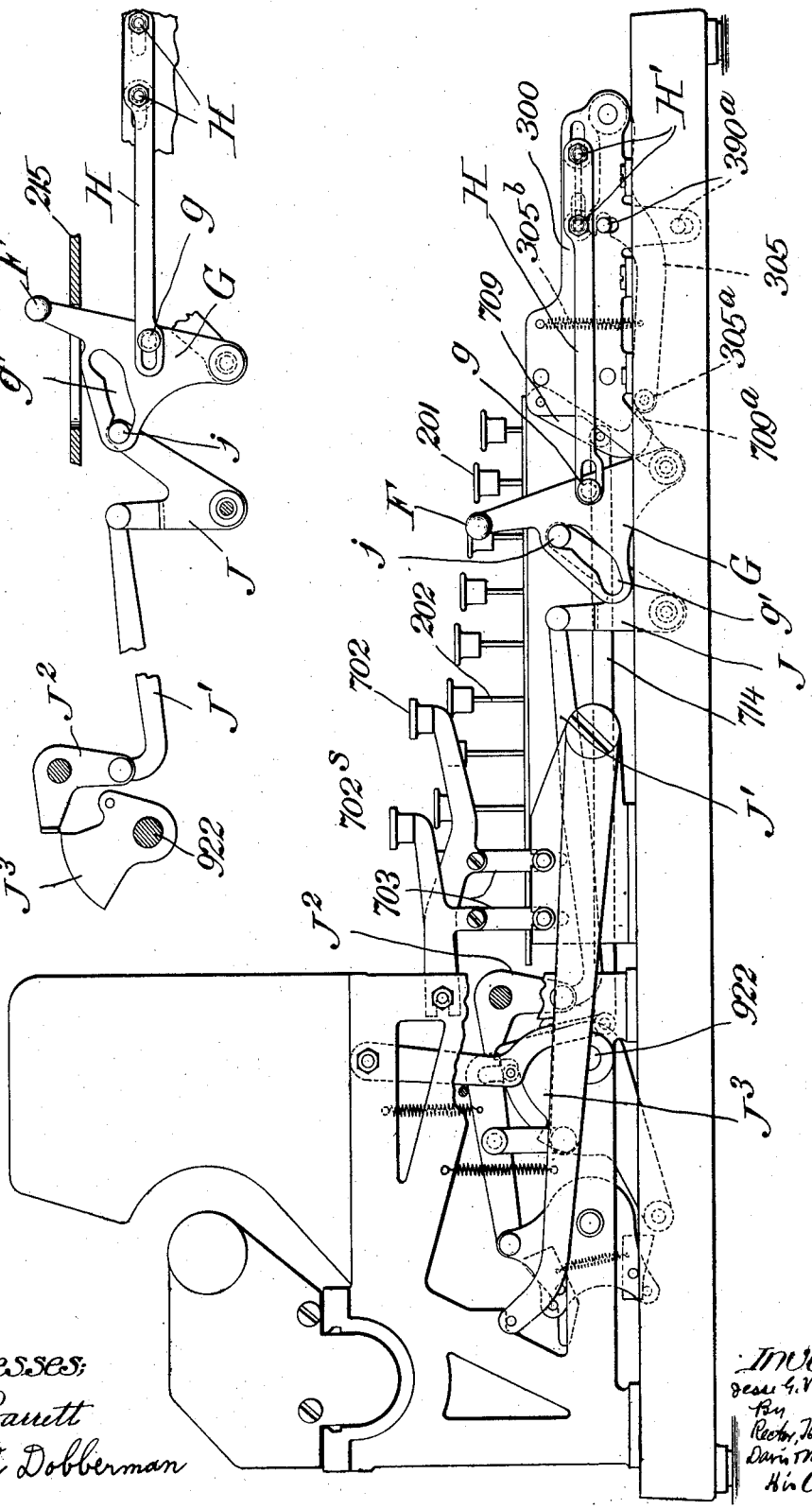

J. G. VINCENT.
ADDING AND SUBTRACTING MACHINE.
APPLICATION FILED SEPT. 12, 1910.
1,027,511.
Patented May 28, 1912.
5 SHEETS—SHEET 3.
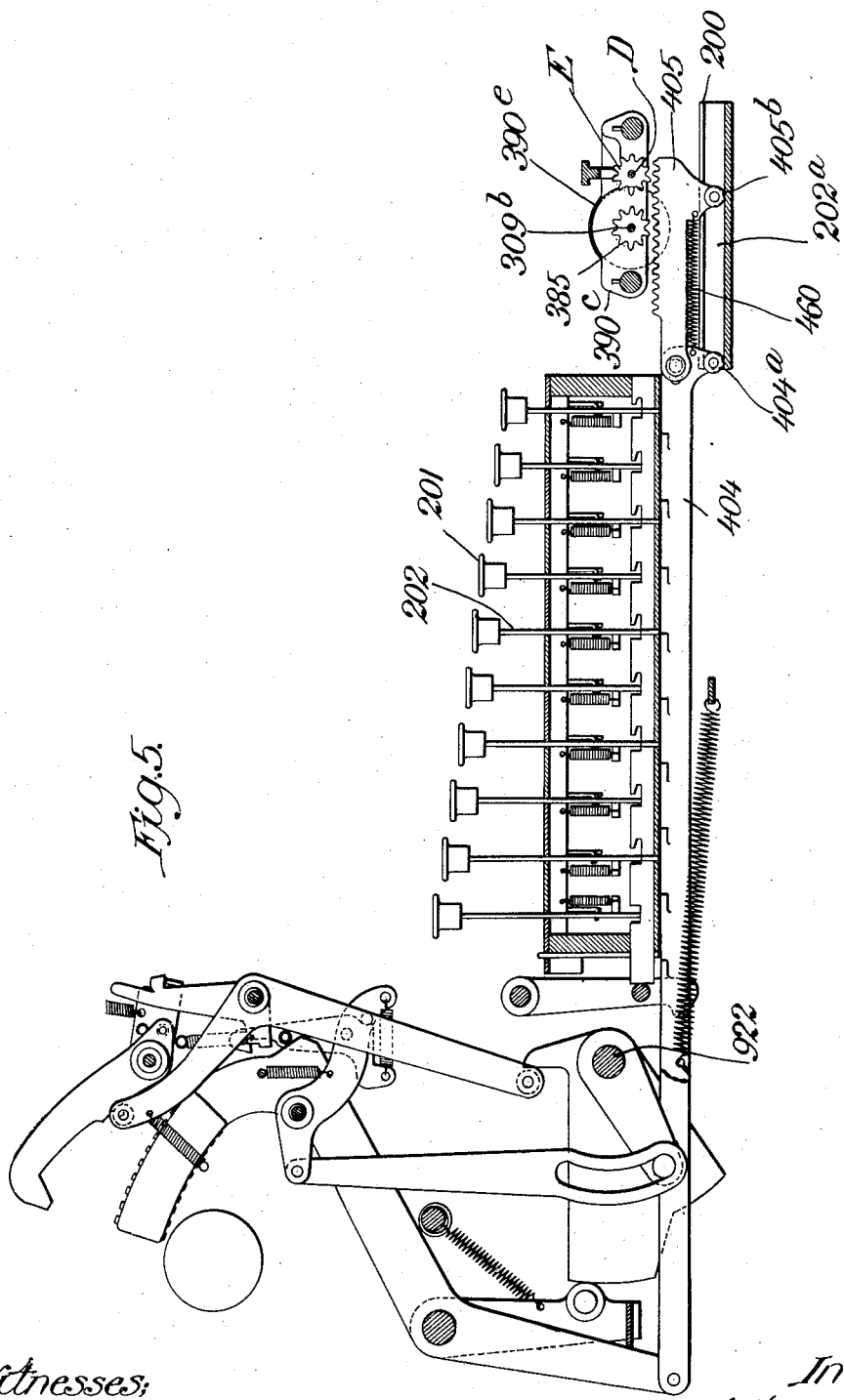
Witnesses:
E. R. Barrett
Robert Dobberman
Inventor
Jesse G. Vincent
By Rector, Hibben, Davis & Macauley
His Attys.

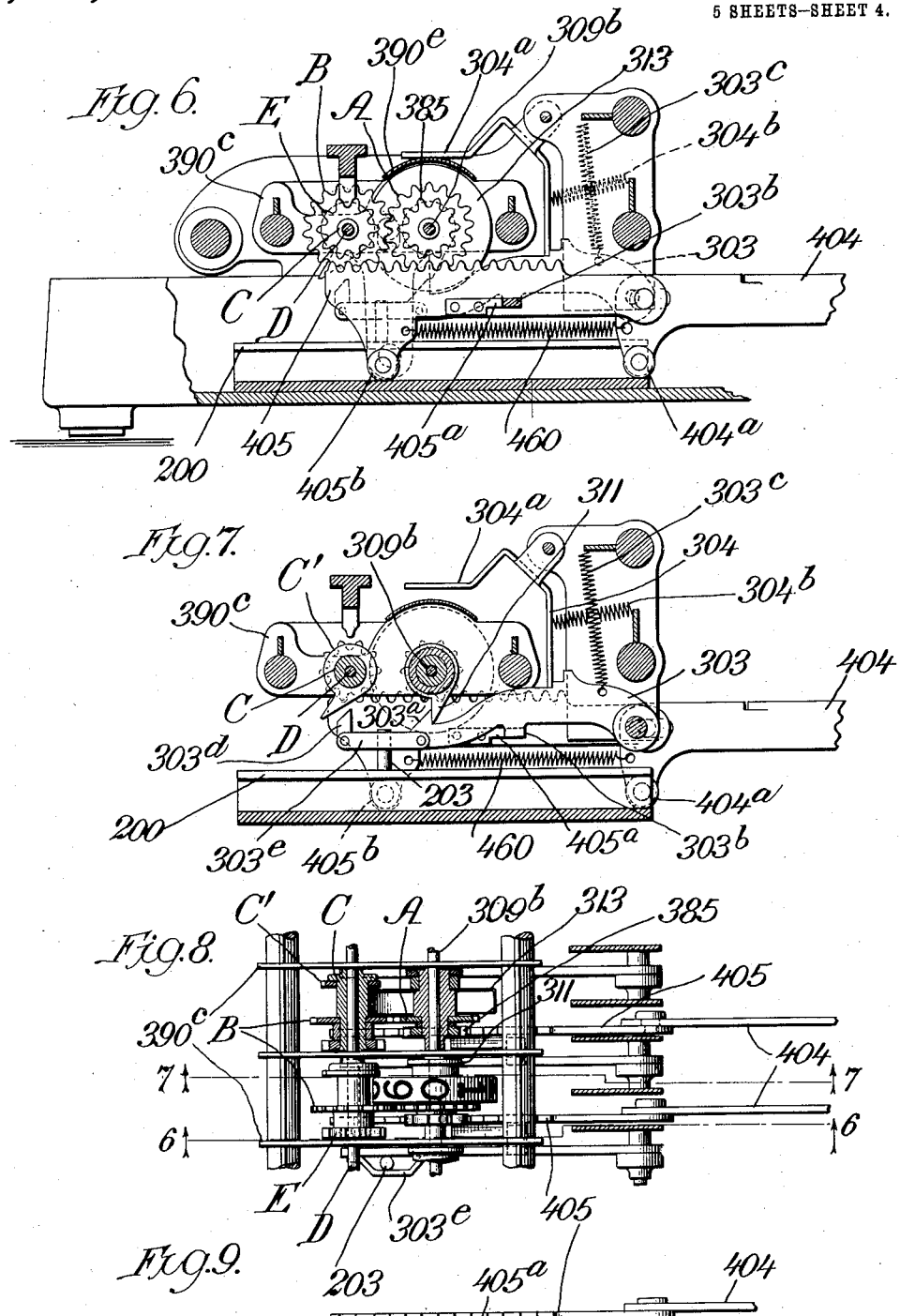

J. G. VINCENT.
ADDING AND SUBTRACTING MACHINE.
APPLICATION FILED SEPT. 12, 1910.
1,027,511.
Patented May 28, 1912.
5 SHEETS—SHEET 5.
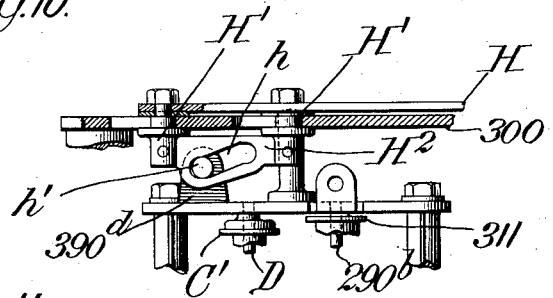
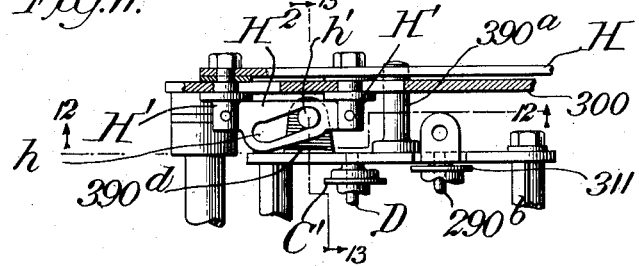
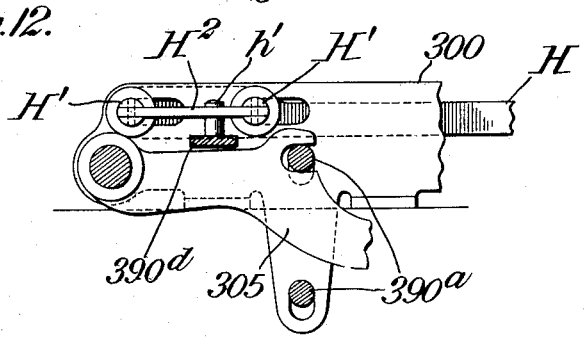
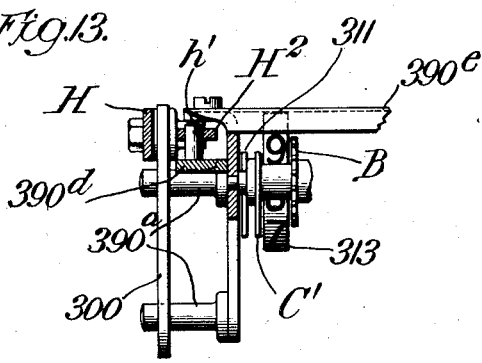

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING AND SUBTRACTING MACHINE.

1,027,511. Specification of Letters Patent. Patented May 28, 1912.

Application filed September 12, 1910. Serial No. 581,602.

*To all whom it may concern:*

Be it known that I, JESSE G. VINCENT, a citizen of the United States, residing at Detroit, in the county of Wayne and State of Michigan, have invented certain new and useful Improvements in Adding and Subtracting Machines, of which the following is a specification.

The object of the present invention is to provide a simplified equipment for an adding machine which will enable it to perform direct subtraction by reverse rotation of registering wheels under control of key-set stops.

I have chosen to exemplify an embodiment of my present invention as adapted to the adding machine known upon the market as the "Pike" and reference may be had to Patents No. 763,692, issued June 28, 1904 and No. 767,596, issued August 16, 1904, for particulars of this style of adding machine. While the latter lends itself readily to an application or adaptation of my invention thereto, it is to be understood that the invention is not necessarily limited to this particular style or character of machines.

In the drawings which accompany and form part of this specification Figure 1 represents, in left side elevation with some parts broken away, a Pike machine having my invention incorporated therein; Fig. 2 represents in sectionalized left side elevation certain parts which appear in Fig. 1 such parts having especially to do with manipulation for converting the machine from an adding to a subtracting machine,—Fig. 2 illustrating the adjustment for subtraction whereas Fig. 1 represents the adjustment for addition; Fig. 3 is an abbreviated top plan view of the machine under the condition illustrated in Fig. 1; Fig. 4 is a vertical cross section taken substantially on the line 4—4 of Fig. 3; Fig. 5 is a longitudinal vertical section of the machine taken substantially on the line 5—5 of Fig. 3; Fig. 6 is a vertical sectional view of the front portion of the machine looking from the opposite direction to that prevailing in Figs. 1 and 5, the section being substantially on the line 6—6 of Fig. 8; Fig. 7 is a somewhat similar view, the section line being farther over toward the left hand side of the machine substantially on the line 7—7 of Fig. 8; Fig. 8 is a sectionalized top plan view of parts appearing in Figs. 6 and 7; Fig. 9 is a detail plan view of parts appearing in elevation in Fig. 7; Figs. 10 and 11 are horizontal sections taken substantially on the line 10—10 of Fig. 4, and illustrating different adjustments, Fig. 10 showing the adjustment for addition and Fig. 11 the adjustment for subtraction; Fig. 12 is a vertical section taken substantially on the line 12—12 of Fig. 11; and Fig. 13 is a section taken on the line 13—13 of Fig. 11.

It will be unnecessary, in view of the full disclosures in prior patents mentioned, to give a detailed description of the Pike machine, but it will suffice to designate a few of the parts thereof with which the added devices of the present invention more directly coöperate. The reference numeral 201 designates the amount key tops whose stems 202 serve as stops to control the excursions of reciprocating bars 404 carrying the racks 405 which turn the registering wheels. The reference numeral 390 designates a frame located above the racks and supporting the registering gear wheels and being movable to engage the latter with and disengage them from said racks, though in the present instance this frame is not pivotally mounted as is the corresponding frame in said prior patents but it moves bodily or rectilinearly and it is also movable laterally for the purposes of subtraction as hereinafter more fully explained. Said frame is lowered and raised through the medium of a pivoted arm 305 somewhat similar to that correspondingly designated in said prior patents, and a link 714 of the same character and operated by the same devices as disclosed in said prior patents. This link does not connect to a toggle joint as in the said prior patents but is pivotally connected to a pendent pivoted arm 709 having a cam foot 709$^a$ to act upon the roller 305$^a$ on the aforesaid arm 305, the latter being normally upheld by a spring 305$^b$, as illustrated in dotted lines in Fig. 1. The reference numerals 702 and 702$^s$ designate total and subtotal keys which have the same connection and coöperation with the devices for operating the aforesaid link 714, as in said prior patents, though in the present instance these keys are in the form of levers jointed to links 703 which are in effect the stem of the keys in the construction of said prior patents.

It will of course be understood that in ordinary adding operations the accumulator frame 390 remains up during the advance of the racks 405 and that said frame is lowered to engage the registering wheels with the racks for the return movement of the latter. It will further be understood that the total and subtotal keys perform the usual function of causing the accumulator frame to lower at the outset of the operation so that the registering wheels are engaged with the racks during advance movements thereof,—the total key effecting disengagement of the wheels for the return stroke of the racks whereas the subtotal key causes the wheels to remain engaged with the racks during the latter's return.

The aforesaid accumulator frame 390 has guiding studs 390ª secured to and projecting from its side plates and occupying vertical slots in fixed upright supporting plates 300 secured to the base of the machine, there being two of the studs at each side of the accumulator frame and in vertical alinement whereby the said frame is at all times held upright and caused to move rectilinearly. The engagement of the studs with the slots is such as to permit the requisite lateral movement of the accumulator frame for subtraction purposes as more fully explained hereinafter. The aforesaid arm 305 which moves said frame up and down has a bifurcation which embraces one of the studs 390ª at the left side of the machine as illustrated in Fig. 1.

Journaled upon a cross rod 309ᵇ of the said accumulator frame is a series of numeral wheels 313, suitably confined laterally between tie plates 390ᶜ of the frame as best shown in Fig. 8. Gear pinions 385 are secured respectively to the hubs of said wheels and are adapted to engage with and disengage from the racks 405 the same as do the correspondingly designated pinions in the construction of said prior patents for purposes of addition and the taking of totals and subtotals. In carrying out the present invention the wheels 313 are additionally equipped with gear wheels A which mesh with gear wheels B respectively secured to sleeves C loose upon a second cross rod D of the accumulator frame, said sleeves being confined laterally by the tie plates 390ᶜ the same as are the wheels 313. There are also secured to these sleeves respectively gear pinions E similar to the gear pinions 385 but out of line therewith so that when the pinions 385 are vertically alined with the racks 405, the pinions E are out of line with the racks or off to the right as the machine would be viewed from the front. Under such conditions the machine would operate as an adding machine performing its functions in the same manner as the machine of said prior patents. However, as before mentioned, the accumulator frame is laterally movable and by so moving it pinions 385 may be shifted to the left out of vertical alinement with the racks and at the same time the gear pinions E brought into vertical alinement with said racks. Then it is apparent that an operation consisting in the setting down of amount keys and the pulling of an operating handle or touching off motor connections, would result in the wheels 313 being turned backward distances measured by the key stops, instead of forward. Thus subtraction would be accomplished by a direct process.

The lateral shifting of the accumulator frame is accomplished by manipulation of a handle F on the upper end of a segmental plate G which protrudes through a slot in the keyboard plate 215, see Fig. 2. Said segmental plate is pivoted at its lower end to a portion of one of the fixed supporting plates 300 and carries a stud $g$ occupying a longitudinal slot in the rear end of a link H which extends forward along said plate 300. This link at its forward end carries a pair of studs or posts H' which extend through horizontal slots in said supporting plate 300 and in bifurcated inner portions support between them a cam plate H². The latter has an oblique slot $h$ which receives a stud $h'$ upstanding from a lip 390ᵈ of the accumulator frame. It will be obvious that rearward rocking of the segmental plate G will, through the connections just described, shift the accumulator frame to the right, whereas forward rocking of said plate will shift the accumulator frame to the left.

To guard against operation of the machine while the accumulator frame is being shifted or at any time when the said frame is not in one or the other of its extreme lateral adjustments and vice versa to prevent shifting of the lever while the machine is being operated, the segmental plate G is formed with an angular slot $g'$ which receives a stud $j$ on a forked arm J pivoted to the base of the machine and connected by a link J' with a locking bell crank lever J² The latter has a laterally turned portion standing adjacent the periphery of a segment J³ secured to the operating shaft 922. When the handle F starts from either of its extreme positions one angular end of the slot $g'$ or the other, coöperating with the stud $j$, will rock the arm J while the stud $g$ is traversing the slot in the link H, and by so rocking said arm will interpose the laterally turned portion of the bell crank lever J² into the path of the segment J³, preventing operation of the machine. So also when the operating shaft 922 is started its segment J³ passes under the said laterally turned portion of the lever J² locking the handle F.

Transfer or carrying mechanism is employed of a character similar to that shown in said prior patents though modified or added to for the purpose of having it effect borrowing as well as carrying. The racks 405 bear the usual relation to the bars 404 in that the racks have studs engaging short horizontal slots in the front ends of the bars and there are springs 460 connecting the racks and bars. Said studs are normally at the forward ends of the slots and the springs are restrained by projections 303$^b$ on transfer pawls 303, said projections engaging lugs 405$^a$ on the racks as illustrated in Figs. 6 and 7. In the present instance the forward ends of the bars 404 and the forward ends of the racks 405 are shown guided in their movements by rollers 404$^a$ and 405$^b$ running upon a base plate below flanges 200 of separating bars 202$^a$, see Fig. 4. The said transfer pawls are adapted to be displaced as usual by transfer cam disks 311 secured to the hubs of the wheels 313 and coöperating with inclined projections 303$^a$ on the said pawls which projections also serve as zero stops. The transfer pawls are stepped or shouldered as usual to provide for their being held displaced the requisite length of time to insure the carrying or borrowing operations. Latches 304 coöperate with the stepped portions of the pawls to this end. In the present instance said latches are of angular form having forwardly projecting portions 304$^a$ overlying the sight plate 390$^e$ carried by the accumulator frame. When the said frame is elevated at the conclusion of an adding or subtracting operation any of the latches which have been holding down the transfer pawls will be displaced so as to release said pawls. Springs 304$^b$ are connected to the latches so as to enforce their proper engagement with the pawls, and springs 303$^c$ are applied to the pawls to bring them back to normal.

For the purpose of displacing the transfer pawls in the case of borrowing, the sleeves C have secured to them transfer cam disks C' similar in outline to the transfer cam disks 311 though differing therefrom in their angular setting upon the supporting sleeves or hubs. It will be understood that this is occasioned by the fact that in borrowing the transfer pawl should be tripped when the wheel is passing backward from zero to nine whereas in carrying the transfer pawl should be tripped when the wheel is passing forward from nine to zero. To adapt them for coöperation with the borrowing cam disks C', the pawls 303 are extended forward and equipped with additional transfer projections 303$^d$ to be acted upon by said cam disks. To guide and stiffen the pawls they are here shown as equipped with brackets 303$^e$ embracing posts 203 rising from the bars 202$^a$ (Fig. 9).

It will of course have been noted that the gear pinions 385 and E are of the same size and that the connecting gears A and B are of the same size, so that necessarily the gear pinions keep in step, it being understood that each gear pinion is connected as one with its gear wheel A or B. The occasion for employing the latter gear wheels is that if the same gears that were to engage the racks, (the one for purposes of addition and the other for purposes of subtraction), were themselves directly in mesh with each other (being wide enough and offset to provide for engagement of one with the rack while the other would be entirely out of vertical alinement with the rack), then the registry of the teeth of the gears with the teeth of the rack would be somewhat affected inasmuch as when the teeth of one gear were in registry with the spaces between the teeth of the rack, the teeth of the other gear wheel would be in registry with points of the teeth of the rack and so provision would have to be made for clearance or lost motion between the gears and the rack.

It will be understood that ordinarily the subtraction projections 303$^d$ do not come into play as zero stops, for the total, subtotal or remainder to be taken would be registered upon the wheels 313 and in a totaling operation the gear pinions 385 would be in operative relation to the racks. However, said transfer projections 303$^d$ may be utilized as zero stops to facilitate the taking of what may be termed a negative total, that is to say, a minus quantity representing the amount by which a subtrahend has exceeded a minuend, e. g. to arrive at the amount by which a depositor in a bank has overdrawn his account. It will be understood that in such case the complement of the minus quantity would be shown upon the wheels 313 and would be printed in a totaling operation with the gear pinions 385 in operative relation to the racks. However, if the totaling operation is performed with the subtraction gear pinions E in operative relation to the racks then of course the rack movement will be measured by abutment of the radial shoulders of the transfer cam disks C' against the transfer projections 303$^d$, and inasmuch as backward turning of the wheels 313 accompanies forward turning of the gear pinions E, the radial edges of the cam disks C' will be spaced from the front sides of the transfer projections 303$^d$ complementally to the spacing of the radial edges of the cam disks 311 from the front sides of the transfer projections 303$^a$. Therefore the minus quantity will be printed as a complement of the registration on the wheels 313, except that said minus quantity will be one cent short, which being understood by the operator will present no serious difficulty in the matter of arriving at the correct minus amount. For example, if the minuend, after one or more subtraction operations has been exceeded by 6.92, the registering wheels 313, assuming a 9 bank machine, would display 999,993.08, being the complement of 6.92. The shoulder of the units cam 311 would have turned backward two steps and the shoulder of the corresponding cam disk C' would have moved forward two steps and therefore be standing one step forward of the front side of the transfer projection 303$^d$, the transfer pawl having of course been tripped. Necessarily, therefore, in a totaling operation with the gear pinions E in mesh with the racks the units gear pinion would move backward a single step and bring the type 1 to the printing line. The shoulder of the 10's cam disk 311 would be directly in front of the corresponding transfer projection 303$^a$ and the cam shoulder of the corresponding disk C' would therefore be one step back of the transfer projection 303$^d$ so that in backward rotation the associated gear pinion E would necessarily turn through nine spaces and the type 9 would be positioned at the printing line in the 10's column. The shoulder of the hundreds cam projection 311 would be seven spaces rearward of the transfer projection 303$^a$ and the shoulder of the corresponding cam disk C' would correspondingly be six spaces forward of the cam projection 303$^d$. Consequently in a totaling operation the type 6 would be brought to the printing line in the hundreds column. As to the higher orders the various shoulders of the cam disks 311 would all be one step back of their transfer projections and correspondingly the shoulders of the cam disks C' would be directly in front of the transfer projections 303$^b$. Consequently zeros would be set up in these higher orders and there would be no printing there. The amount printed would be 6.91, being the complement of the registration on the wheels 313, minus one cent, and thus giving the negative total or minus quantity desired.

What I claim is:

1. The combination with reciprocatory type carriers and wheel actuators; of wheels adapted to be directly turned thereby but capable of disconnection therefrom as to direct turning thereby; intermediate wheels for transmitting motion between said actuators and the first-mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels with provision for reversing the order at will; and two sets of stops one for each set of wheels adapted to limit reverse rotation thereof.

2. The combination with reciprocatory type carriers and wheel-actuating racks; of two sets of gear wheels separately engageable with the racks and geared to each other; means for putting either set of wheels into direct operative relation with the racks; means for reciprocating the latter; means for variously measuring excursions thereof; means for regulating the periods of engagement and disengagement between racks and wheels with provisions for reversing the order at will; and two sets of stops one for each set of wheels adapted to limit reverse rotation thereof.

3. The combination with reciprocatory type carriers and wheel-actuating racks; of two sets of gear wheels laterally shiftable for separate engagement with the racks and geared to each other; means for putting either set of wheels into direct operative relation with the racks; means for reciprocating the latter; means for variously measuring excursions thereof; means for regulating the periods of engagement and disengagement between racks and wheels with provisions for reversing the order at will; and two sets of stops one for each set of wheels adapted to limit reverse rotation thereof.

4. The combination with reciprocating racks and means for variously measuring excursions thereof; of two sets of gear wheels out of alinement with each other and geared together; a support for said gear wheels laterally shiftable to bring either set in alinement with the racks; and means for engaging the alined set of gear wheels with and disengaging it from the racks.

5. The combination with reciprocating racks and means for variously measuring excursions thereof; of two sets of gear wheels out of alinement with each other and geared together; a support for said gear wheels laterally shiftable to bring either set in alinement with the racks and also movable to engage the alined set with and disengage it from the racks; and means for moving said support.

6. The combination with reciprocating racks and means for variously measuring excursions thereof; of two sets of gear wheels out of alinement with each other and geared together; a support for said gear wheels laterally shiftable to bring either set in alinement with the racks; means for engaging the alined set of gear wheels with and disengaging it from the racks; carriers for the racks the latter capable of limited relative movement for transfer purposes; transfer pawls having two sets of projections one for each set of wheels; and coöperating projections on the wheels those on one set of wheels being angular with relation to those on the other set of wheels; substantially as and for the purpose described.

7. The combination with reciprocating racks and means for variously measuring excursions thereof; of two sets of gear wheels out of alinement with each other and geared together; a support for said gear wheels laterally shiftable to bring either set in alinement with the racks and also movable to engage the alined set with and disengage it from the racks; and means for moving said support laterally comprising a hand lever, a cam plate engaging the support, and connections between the said hand lever and cam plate.

8. In a machine of the class described, the combination of adding wheels and subtracting wheels geared together, wheel-actuators and type-carriers; zero-setting means, those of one set of wheels complementally related to those of the other; and controlling devices whereby to position the type carriers by zero turning of either set of wheels.

9. In a machine of the class described, the combination of adding and subtracting wheels geared together, and complementally related, type-carriers, and control-devices whereby the type-carriers may be positioned from either set of wheels,—for positive totaling purposes in the one case and negative totaling purposes in the other.

JESSE G. VINCENT.

Witnesses:
ARTHUR W. FRENZEL,
EMMA L. BURGESS.